US010868440B2

(12) United States Patent
Sato et al.

(10) Patent No.: US 10,868,440 B2
(45) Date of Patent: Dec. 15, 2020

(54) COMPRESSED AIR ENERGY STORAGE GENERATOR

(71) Applicant: KOBE STEEL, LTD., Hyogo (JP)

(72) Inventors: Takashi Sato, Takasago (JP); Ryo Nakamichi, Takasago (JP); Masaki Matsukuma, Takasago (JP); Hiroki Saruta, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 16/603,812

(22) PCT Filed: Apr. 10, 2018

(86) PCT No.: PCT/JP2018/015071
§ 371 (c)(1),
(2) Date: Oct. 8, 2019

(87) PCT Pub. No.: WO2018/198756
PCT Pub. Date: Nov. 1, 2018

(65) Prior Publication Data
US 2020/0083743 A1 Mar. 12, 2020

(30) Foreign Application Priority Data
Apr. 26, 2017 (JP) ................................ 2017-087528

(51) Int. Cl.
*F02C 6/16* (2006.01)
*H02J 15/00* (2006.01)
*H02K 7/18* (2006.01)

(52) U.S. Cl.
CPC .......... *H02J 15/006* (2013.01); *H02K 7/1823* (2013.01)

(58) Field of Classification Search
CPC ..... H02J 15/006; H02K 7/1823; Y02E 70/30; F02C 6/16
See application file for complete search history.

(56) References Cited

U.S. PATENT DOCUMENTS

2003/0033811 A1 2/2003 Gerdes
2015/0000248 A1* 1/2015 del Omo ................ F01K 23/10 60/39.182

(Continued)

FOREIGN PATENT DOCUMENTS

EP 2586997 A2 5/2013
EP 3239491 A1 11/2017

(Continued)

OTHER PUBLICATIONS

The extended European search report issued by the European Patent Office dated Aug. 14, 2020, which corresponds to European Patent Application No. 187909122-1202 and is related to U.S. Appl. No. 16/603,812.

(Continued)

*Primary Examiner* — Muhammad S Islam
(74) *Attorney, Agent, or Firm* — Studebaker & Brackett PC

(57) ABSTRACT

A compressed air energy storage generator includes a motor, a compressor, a pressure accumulator, an expander, a generator, an electric-motor inverter, a generator inverter, a feed command receiver, a discharge command receiver, and a controller. The controller includes a feed determination unit, a discharge determination unit, and an input and output adjustment unit, the feed determination unit being configured to determine whether a feed command value is smaller than minimum charge power, the discharge determination unit being configured to determine whether a discharge command value is smaller than minimum discharge power, the input and output adjustment unit being configured to control, when the feed determination unit determines that the feed command value is smaller than the minimum charge power or when the discharge determination unit determines that the discharge command value is smaller than the mini- (Continued)

mum discharge power, the inverters to simultaneously drive the motor and the generator.

9 Claims, 5 Drawing Sheets

(56) References Cited

U.S. PATENT DOCUMENTS

| | | | |
|---|---|---|---|
| 2017/0159649 | A1 | 6/2017 | Sakamoto et al. |
| 2018/0266315 | A1 | 9/2018 | Kubo et al. |

FOREIGN PATENT DOCUMENTS

| | | | |
|---|---|---|---|
| EP | 3300210 | A1 | 3/2018 |
| JP | H09-191586 | A | 7/1997 |
| JP | 2011-106333 | A | 6/2011 |
| JP | 2016-121675 | A | 7/2016 |
| JP | 2016-211515 | A | 12/2016 |
| JP | 2016/220350 | A | 12/2016 |

OTHER PUBLICATIONS

International Preliminary Report on Patentability issued in corresponding International Application No. PCT/JP2018/015071; dated Nov. 7, 2019; with English translation.

* cited by examiner

Controller
1
2
2a
3
3a
4
5a
5d
6a
6b
10
10a
10b
11
12
12a
12b
13
14
15
16
30
31
32
W
M
I
G
R 30
Controller
30a
Feed determination unit
30b
Feed shortage calculation unit
30c
Discharge determination unit
30d
Discharge shortage calculation unit
30e
Input and output adjustment unit
2a
W
31
R
3a
W
32
R
14
I
16
I
6a, 6b 1
11
Controller
30
31
32
R
M
I
G
W
2
2a
3
3a
4
5a
5b
5c
5d
6a
6b
10
10a
10b
12
12a
12b
13
14
15
16

30
Controller
2a
31
W
R
30a
Feed determination unit
14
I
3a
32
W
R
30b
Feed shortage calculation unit
16
I
30c
Discharge determination unit
6a, 6b
30d
Discharge shortage calculation unit
30e
Input and output adjustment unit
30f
Control unit for leveling compression
30g
Control unit for leveling expansion

COMPRESSED AIR ENERGY STORAGE GENERATOR

CROSS-REFERENCE TO RELATED APPLICATIONS

This is a national phase application in the United States of International Patent Application No. PCT/JP2018/015071 with an international filing date of Apr. 10, 2018, which claims priority of Japanese Patent Application No. 2017-087528 filed on Apr. 26, 2017 the contents of which are incorporated herein by reference.

TECHNICAL FIELD

The present invention relates to a compressed air energy storage generator.

BACKGROUND ART

Power generation using renewable energy such as wind power or solar power depends on weather conditions, so the output may not be stable. Therefore, it is necessary to use an energy storage system in order to obtain necessary power at any time. As an example of such a system, a compressed air energy storage (CAES) generator is known, for example.

The CAES generator drives a compressor with renewable energy to produce compressed air and stores the compressed air in a tank or the like, and then drives a turbine generator with the compressed air to generate power on an as-needed basis. Such a CAES generator is disclosed, for example, in JP 2016-34211 A.

SUMMARY OF THE INVENTION

Problems to be Solved by the Invention

In general, a minimum output required for driving the electric motor or the generator is specified. In other words, when an output less than the specified minimum output is required, such an electric motor or a generator cannot respond. In JP 2016-34211 A, there is no suggestion about a method for handling such a case where an output less than such a specified minimum output is required. Therefore, the CAES generator disclosed in JP 2016-34211 A is likely to stop its operation when an output less than the specified minimum output is required.

It is an object of the present invention to provide a compressed air energy storage generator capable of responding even when an output less than a specified minimum output is required for an electric motor or a generator.

Means for Solving the Problems

A compressed air energy storage generator according to one aspect of the present invention includes an electric motor configured to be driven with input power that fluctuates, a plurality of compressor configured to be driven by the electric motor to compress air, a pressure accumulator configured to hold the compressed air discharged from the compressors, a plurality of expander configured to be driven with the compressed air supplied from the pressure accumulator, a generator configured to be driven by the expanders to supply, to a consumer facility, output power that fluctuates, an electric-motor inverter configured to change a rotation speed of the electric motor, a generator inverter configured to change a rotation speed of the generator, a feed command receiver configured to receive the input power as a feed command value before feeding the input power, a discharge command receiver configured to receive, from the consumer facility, demand power as a discharge command value before outputting the output power, and a controller including a feed determination unit, a discharge determination unit, and an input and output adjustment unit, the feed determination unit being configured to determine whether the feed command value is smaller than minimum charge power corresponding to a minimum rotation speed of the electric motor, the discharge determination unit being configured to determine whether the discharge command value is smaller than minimum discharge power corresponding to a minimum rotation speed of the generator, the input and output adjustment unit being configured to control, when the feed determination unit determines that the feed command value is smaller than the minimum charge power or when the discharge determination unit determines that the discharge command value is smaller than the minimum discharge power, the electric-motor inverter and the generator inverter to simultaneously drive the electric motor and the generator.

According to this configuration, it is possible to store energy (input power) such as renewable energy whose output fluctuates irregularly in the pressure accumulator in the form of compressed air and to supply the compressed air to the expander on an as-needed basis to drive the generator to generate power. Hereinafter, a process of causing the compressor to produce the compressed air and storing the compressed air in the pressure accumulator is also referred to as charging, and a process of causing the generator to generate power from the compressed air stored in the pressure accumulator is also referred to as discharging. In particular, according to the above-described configuration, the feed determination unit can determine whether the feed command value is large enough to drive the electric motor, and the discharge determination unit can determine whether the discharge command value is large enough to drive the generator. When a determination is made that one of the command values is not large enough, that is, an output smaller than the specified minimum output is required, the electric motor or the generator cannot be driven separately, but the electric motor and the generator can be driven simultaneously so that the input and output adjustment unit causes the output of one of the electric motor and the generator to offset the output of the other. Specifically, with considering given to power to be input (input power) and power to be output (output power), since the feed command value and the discharge command value have an offset relation, when the feed command value is insufficient, the feed command value is increased, and the discharge command value is increased by the same amount to cause both the command values to offset each other, thereby compensating for a shortage of the feed command value. Further, when the discharge command value is insufficient, the discharge command value is increased, and the feed command value is increased by the same amount to cause both the command values to offset each other, thereby compensating for a shortage of the discharge command value. A typical CAES generator that does not have the above-described configuration is not capable of responding to a feed command value or a discharge command value that does not reach to the specification, but, the above-described configuration allows the operation to continue even when such a command value is given.

The controller may further include a feed shortage calculation unit configured to calculate, when the feed determination unit determines that the feed command value is smaller than the minimum charge power, a difference between the feed command value and the minimum charge power as a feed shortage amount, and the input and output adjustment unit may drive the generator to generate power equal to or greater than the feed shortage amount, and drive the electric motor with power that is equal to or greater than the minimum charge power and includes both the input power indicated by the feed command value and the power equal to or greater than the feed shortage amount generated by the generator.

According to this configuration, the feed shortage calculation unit can calculate the feed shortage amount, and the input and output adjustment unit can compensate for the feed shortage amount, and thus it is possible to secure the minimum charge power for driving the electric motor. Therefore, it is possible to execute the operation to continue even when a feed command value that does not reach to the specification is given.

The controller may further include a discharge shortage calculation unit configured to calculate, when the discharge determination unit determines that the discharge command value is smaller than the minimum discharge power, a difference between the discharge command value and the minimum discharge power as a discharge shortage amount, and the input and output adjustment unit may drive the generator at the minimum rotation speed or higher and drive the electric motor with power that is equal to or greater than the discharge shortage amount and equal to or greater than the minimum charge power.

According to this configuration, the discharge shortage calculation unit can calculate the discharge shortage amount, and the input and output adjustment unit can make up for the discharge shortage amount, and thus it is possible to secure the minimum discharge power for driving the generator. Therefore, it is possible to execute the operation to continue even when a discharge command value that does not reach to the specification is given.

Pluralities of the compressors and the electric motors may be provided, and the controller may further include a control unit for leveling compression configured to control the electric-motor inverter to level off drive times of combinations of the compressors and the electric motors.

According to this configuration, since the drive times of the compressors and the electric motors can be leveled off by the control unit for leveling compression, it is prevented that only specific compressors and electric motors are driven and deteriorated.

Pluralities of the expanders and the generators may be provided, and the controller may further include a control unit for leveling expansion configured to control the generator inverter to level off drive times of combinations of the expanders and the generators.

According to this configuration, since the drive times of the expanders and the generators can be leveled off by the control unit for leveling expansion, it is prevented that only specific expanders and generators are driven and deteriorated.

Effects of the Invention

According to the present invention, in the compressed air energy storage generator including a plurality of compressors or expanders, the respective rotation speeds of the compressors or expanders are suitably controlled, thereby increasing the operation efficiency.

MODE FOR CARRYING OUT THE INVENTION

Hereinafter, a description will be given of an embodiment of the present invention with reference to the accompanying drawings.

First Embodiment

Figure 1:
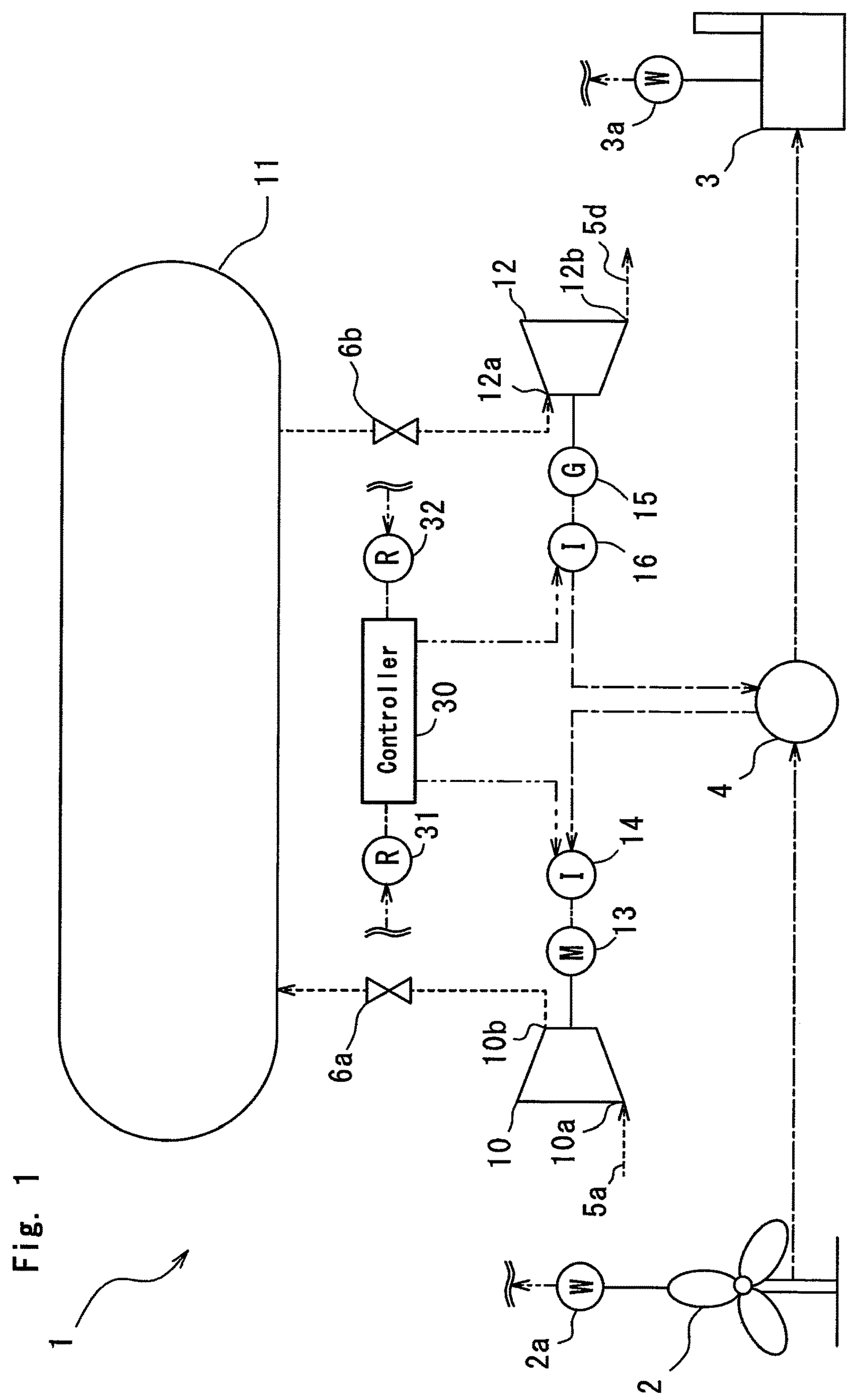
FIG. 1 is a schematic configuration diagram of a compressed air energy storage generator according to a first embodiment of the present invention.

A compressed air energy storage (CAES) generator 1 shown in FIG. 1 holds, in the form of compressed air, power generated by a power generation facility 2 using renewable energy such as wind power generation or solar power generation, and generates, on an as-needed basis, power using the compressed air to supply the power to a consumer facility 3 such as a village, a target area for district heating and cooling, a large scale shopping center, a substation, or a factory.

According to the present embodiment, the power generation facility 2 is provided with a feed command transmitter **2*a*. The feed command transmitter 2*a* transmits a feed command value to the CAES generator 1. Further, the consumer facility 3 is provided with a discharge command transmitter 3*a*. The discharge command transmitter 3*a* transmits a discharge command value to the CAES generator 1. Herein, the feed command value indicates power with which the CAES generator 1 is charged (input power to be described later) of power generated by the power generation facility 2, and the discharge command value indicates power the consumer facility 3 demands from the CAES generator 1 (demand power to be described later). As described later, the CAES generator 1 performs necessary charging and discharging based on the feed command value and the discharge command value. Although the feed command transmitter 2*a* is attached to the power generation facility 2 according to this embodiment, the feed command transmitter 2*a* need not necessarily be attached to the power generation facility 2** and may be installed at another location in a power system such as a substation.

The CAES generator 1 includes a plurality of compressors 10, a pressure accumulation tank (pressure accumulator) 11, and a plurality of expanders 12. According to the present embodiment, three compressors 10 and three expanders 12 are deployed. A motor (electric motor) 13 is mechanically connected to each of the compressors 10. An electric-motor inverter 14 is electrically connected to each of the motors 13. Further, a generator 15 is mechanically connected to each of the expanders 12. A generator inverter 16 is electrically connected to each of the generators 15.

Power generated by the power generation facility 2 using renewable energy is supplied to the motors 13 via a power transmission and reception facility 4 and the electric-motor inverters 14. Hereinafter, the power supplied from the power generation facility 2 to the motors 13 is referred to as input power.

The compressors 10 of the present embodiment are of a screw type. Therefore, the compressors 10 of the present embodiment each includes a pair of screw rotors (not shown) in the compressor 10, and the pair of screw rotors are mechanically connected to a corresponding one of the motors 13. Note that each of the compressors 10 only needs to have a rotation speed control capability, and thus is not limited to the screw type and may be, for example, of a scroll type.

An intake port 10*a* of each of the compressors 10 communicates with outside air through air piping 5*a*. A discharge port 10*b* of each of the compressors 10 is fluidly connected to the pressure accumulation tank 11 through air piping 5*b*. A valve 6*a* is attached to the air piping 5*b* and is capable of allowing or blocking a flow of air.

Upon being supplied with the input power, each of the motors 13 is actuated to rotate the above-described screw rotors to drive a corresponding one of the compressors 10. Each of the compressors 10 draws in air from the intake port 10*a* through the air piping 5*a*, compresses and discharges the air from the discharge port 10*b*, and pressure-feeds the compressed air to the pressure accumulation tank 11 through the air piping 5*b*.

The pressure accumulation tank 11 is, for example, a steel tank, and holds the compressed air pressure-fed from each of the compressors 10. The pressure accumulation tank 11 is fluidly connected to the expanders 12 through air piping 5*c*, and the compressed air stored in the pressure accumulation tank 11 is supplied to the expanders 12 through the air piping 5*c*. Further, a valve 6*b* is attached to the air piping 5*c* and is capable of allowing or blocking a flow of air.

The expanders 12 of the present embodiment is of a screw type. Therefore, the expanders 12 of the present embodiment each includes a pair of screw rotors (not shown), and the pair of screw rotors are mechanically connected to a corresponding one of the generators 15. Note that each of the expanders 12 only needs to have a rotation speed control capability, and thus is not limited to the screw type and may be, for example, of a scroll type.

As described above, an inlet port 12*a* of each of the expanders 12 is fluidly connected to the pressure accumulation tank 11 through the air piping 5*c*. An outlet port 12*b* of each of the expanders 12 is open to outside air through air piping 5*d*.

When the compressed air is supplied to each of the expanders 12, the above-described screw rotors rotates to drive a corresponding one of the expanders 12, that is, to drive a corresponding one of the generators 15. Air (exhaust air) expanded by each of the expanders 12 is exhausted to outside air from a corresponding one of the outlet ports 12*b* through the air piping 5*d*.

The generators 15 are driven by the expanders 12 to generate power. Each of the generators 15 is electrically connected to the power consumer facility 3 such as a factory, and the power generated by each of the generators 15 is supplied to the consumer facility 3.

Further, the CAES generator 1 includes a controller 30. The controller 30 includes hardware including a central processing unit (CPU) and storage devices such as a random access memory (RAM) and a read only memory (ROM), and software implemented in the hardware.

Figure 2:
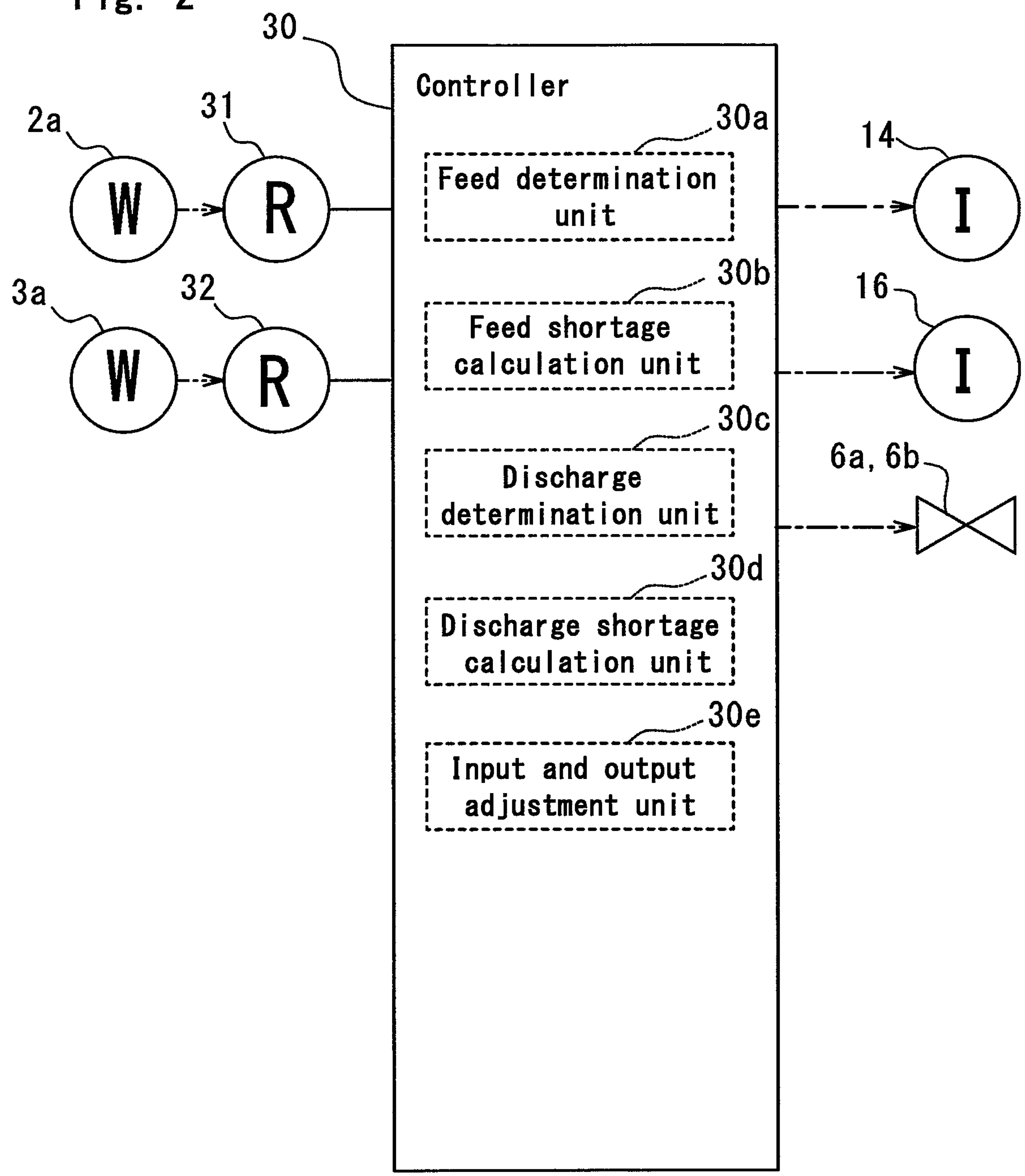
FIG. 2 is a control block diagram of the compressed air energy storage generator according to the first embodiment.

As shown in FIGS. 1 and 2, a feed command receiver 31 and a discharge command receiver 32 are electrically connected to the controller 30. Upon receiving the feed command value from the feed command transmitter 2*a*, the feed command receiver 31 transfer the feed command value to the controller 30. Upon receiving the discharge command value from the discharge command transmitter 3*a*, the discharge command receiver 32 transfers the discharge command value to controller 30. The controller 30 controls the electric-motor inverter 14, the generator inverter 16, and the valves 6*a*, 6*b* based on the feed command value and the discharge command value.

The controller 30 of the present embodiment includes a feed determination unit 30*a*, a feed shortage calculation unit 30*b*, a discharge determination unit 30*c*, a discharge shortage calculation unit 30*d*, and an input and output adjustment unit 30*e*.

The feed determination unit 30*a* determines whether the feed command value is smaller than power (minimum charge power) corresponding to a minimum rotation speed of the motor 13. In other words, the feed determination unit 30*a* determines whether the motor 13 can be driven with the input power indicated by the feed command value.

When the feed determination unit 30*a* determines that the feed command value is smaller than the minimum charge power, the feed shortage calculation unit 30*b* calculates a difference between the feed command value and the minimum charge power as a feed shortage amount. The feed shortage amount represents power that results from subtracting the input power indicated by the feed command value from power necessary to drive the motor 13.

The discharge determination unit 30*c* determines whether the discharge command value is smaller than power (minimum discharge power) corresponding to the minimum rotation speed of the generator 15. In other words, the discharge determination unit 30*c* determines whether the generator 15 can respond to the discharge command value.

When the discharge determination unit 30*c* determines that the discharge command value is smaller than the minimum discharge power, the discharge shortage calculation unit 30*d* calculates a difference between the discharge command value and the minimum discharge power as a discharge shortage amount. The discharge shortage amount represents a discharge amount that results from subtracting the discharge command value from a discharge amount necessary to drive the generator 15.

When the feed determination unit 30*a* determines that the feed command value is smaller than the minimum charge power, or when the discharge determination unit determines that the discharge command value is smaller than the minimum discharge power, the input and output adjustment unit 30*e* controls the electric-motor inverter 14 and the generator inverter 16 to simultaneously drive the motor 13 and the generator 15.

To be specific, when the feed determination unit 30*a* determines that the feed command value is smaller than the minimum charge power, the input and output adjustment unit 30*e* drives the generator 15 to generate power equal to or greater than the feed shortage amount, and then drives the motor 13 with power that is equal to or greater than the minimum charge power and includes both the input power indicated by the feed command value and the power equal to or greater than the feed shortage amount generated by the generator 15. Specifically, when the feed determination unit 30*a* determines that the feed command value is smaller than the minimum charge power, the input and output adjustment unit 30*e* opens the valve 6*b* to supply the compressed air from the pressure accumulation tank 11 to the expander 12. Next, the input and output adjustment unit 30*e* controls the generator inverter 16, that is, controls the rotation speed of the generator 15 to generate the power equal to or greater than the feed shortage amount. Then, the input and output adjustment unit 30*e* controls the electric-motor inverter 14, that is, controls the rotation speed of the motor 13 to adjust the power including the input power indicated by the feed command value and the power equal to or greater than the feed shortage amount generated by the generator 15 to an output that allows the motor 13 to be driven. At this time, the input and output adjustment unit 30*e* opens the valve 6*a* to allow the compressed air to be supplied from the compressor 10 to the pressure accumulation tank 11.

Further, when the discharge determination unit determines that the discharge command value is smaller than the minimum discharge power, the input and output adjustment unit 30*e* drives the generator 15 at the minimum rotation speed or higher and drives the motor 13 with power that is equal to or greater than the discharge shortage amount and equal to or greater than the minimum charge power. Specifically, when the discharge determination unit determines that the discharge command value is smaller than the minimum discharge power, the input and output adjustment unit 30*e* opens the valve 6*b* to supply the compressed air from the pressure accumulation tank 11 to the expander 12. Next, the input and output adjustment unit 30*e* controls the generator inverter 16, that is, controls the rotation speed of the generator 15 to drive the generator 15 at the minimum rotation speed or higher. At this time, since output power equal to or greater than the discharge command value is generated, surplus power exists. Then, the input and output adjustment unit 30*e* controls the electric-motor inverter 14, that is, controls the rotation speed of the motor 13 to drive the motor 13 so as to offset this surplus power. At this time, the input and output adjustment unit 30*e* opens the valve 6*a* to allow the compressed air to be supplied from the compressor 10 to the pressure accumulation tank 11.

Under the control of the input and output adjustment unit 30*e*, the power generated by the generator 15 is not directly supplied to the motor 13, but, as a result, the power consumed by the motor 13 and the power generated by the generator 15 offset each other. Therefore, such control performed by the input and output adjustment unit 30*e* can be implemented only by updating software in the controller 30 and with existing equipment without requiring additional equipment such as electrical wiring for connecting the generator 15 and the motor 13.

Figure 3:
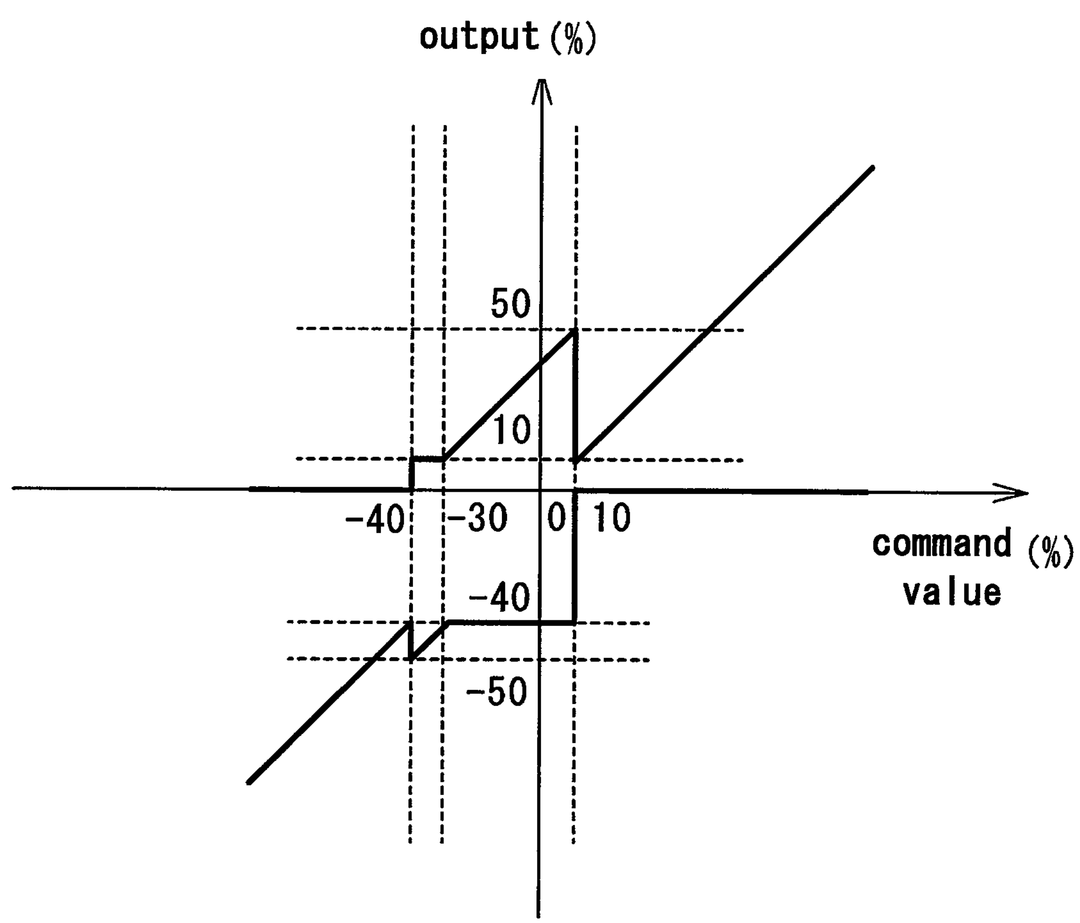
FIG. 3 is a graph relating to feed to and discharge from the compressed air energy storage generator according to the first embodiment.

FIG. 3 is a graph showing the control performed by the input and output adjustment unit 30*e*. An abscissa axis of FIG. 3 represents a command value, the feed command value is represented by a negative value, and the discharge command value is represented by a positive value. An ordinate axis of FIG. 3 represents the output of the motor 13 and the output of the generator 15, the output of the motor 13 (power to be consumed) is represented by a negative value, and the output of the generator 15 (power to be generated) is represented by a positive value. Both the command value on the abscissa axis and the output on the ordinate axis are each shown as a proportion in a rated state defined as 100%.

The motor 13 of the present embodiment has an output of −40% (minimum output) at the minimum rotation speed with respect to a rated output defined as 100%. In other words, the motor 13 of the present embodiment outputs 40% of the rated power when the input power is equal to the minimum charge power. That is, the motor 13 of the present embodiment cannot respond to a command value greater than −40%. Further, the generator 15 of the present embodiment has an output of 10% (minimum output) at the minimum rotation speed with respect to the rated output defined as 100%. In other words, the generator 15 of the present embodiment outputs 10% of the rated power as the minimum discharge power. That is, the generator 15 of the present embodiment cannot respond to a command value less than 10%. Therefore, a response to the command value in the range of −40% to 10% cannot be made without any additional control, but, according to the present embodiment, a response to the command value in the entire range of −100% to 100% can be made by the following ways.

As shown in FIG. 3, when the command value equal to or less than −40%, that is, the feed command value for driving the motor 13 to output at least 40% of the rated output is given, the motor 13 is driven only with the input power indicated by the command value. For example, when the command value of −50% is given, the output of the motor 13 becomes −50% in accordance with the command value. At this time, the generator 15 is not driven.

When the command value equal to or greater than 10%, that is, the discharge command value for driving the generator 15 to output at least 10% of the rated output is given, the generator 15 is driven only in accordance with the discharge command value. For example, when the command value of 50% is given, the output of the generator 15 is 50% in accordance with the command value. At this time, the motor 13 is not driven.

Since the minimum output of the motor 13 is −40%, the feed command value in a range of −30% to 0% is insufficient to drive the motor 13. Since the feed command value and the discharge command value have a positive and negative offset relation, when the feed command value is insufficient, the feed command value is increased, and the discharge command value is increased by the same amount to cause both the command values to offset each other, thereby compensating for a shortage of the feed command value. Therefore, the shortage of the feed command value (feed shortage amount) is calculated by the feed shortage calculation unit 30*b* as described above, and a discharge command value equal to or greater than the feed shortage amount thus calculated is given to the generator 15 to generate power. For example, when the command value of −20% is given, the feed shortage amount is calculated as −20%. Therefore, −20% and corresponding 20% are added to the feed command value and the discharge command value, respectively, to make an addition amount serving as a total command value equal to 0%. That is, the command value of 20% for the generator 15 and the command value of −40% for the motor 13 are added to each other to coincide with the actual command value of −20%, thereby preventing inconsistency with the actual command value. As a result, the command value for the motor 13 becomes −40%, and thus the motor 13 can achieve the minimum output of −40%. Note that, generally, the output of the motor 13 and the output of the generator 15 often differ from each other in absolute value from the viewpoint of output efficiency even when their respective proportions to the ratings are identical to each other. Therefore, the command values may fail to exactly offset each other. In such a case, a correction factor is used to increase or decrease the output of one of the motor 13 and the generator 15 in proportion to the output of the other, thereby allowing the command values to offset each other.

When the command value is in a range of −40% to −30%, approximately the same control as when the command value is in a range of −30% to 0% is performed. Note that, at this time, the output of the generator 15 is fixed to the minimum output of 10%. For example, when the command value of −35% is given, the feed shortage amount is calculated as −5%. Therefore, −5% and corresponding 5% are added to the feed command value and the discharge command value, respectively, to make the addition amount serving as the total command value equal to 0%. However, according to the present embodiment, since the minimum output of the generator 15 is 10%, it is necessary to secure the discharge command value of 10% or greater to drive the generator 15 with the minimum output of 10% or greater. Therefore, for example, when the command value of −35% is given, the feed shortage amount becomes −5%, but −10% and 10% are added to the feed command value and the discharge command value, respectively, to make the addition amount serving as the total command value equal to 0%. That is, both the command value of 10% for the generator 15 and the command value of −45% for the motor 13 are added to each other to coincide with the actual command value of −35%, thereby preventing inconsistency with the actual command value. As a result, the command value for the motor 13 becomes −45%, so that the motor 13 can achieve the minimum output of −40%, and the command value for the generator 15 becomes 10%, so that the generator 15 can also achieve the minimum output of 10%.

Since the minimum output of the generator 15 is 10%, the discharge command value in a range of 0% to 10% is insufficient to drive the generator 15. When the discharge command value is insufficient, as in the case where the feed command value is insufficient, the discharge command value is increased, and the feed command value is increased by the same amount to cause both the command values to offset each other, thereby compensating for a shortage of the discharge command value. Therefore, the shortage of the discharge command value (discharge shortage amount) is calculated by the discharge shortage calculation unit 30*d* as described above, and then charging to a degree equal to or greater than the discharge shortage amount thus calculated is made by the motor 13. For example, when the command value of 5% is given, the discharge shortage amount is calculated as 5%. Therefore, 5% and corresponding −5% are added to the discharge command value and the feed command value, respectively, to make the addition amount serving as the total command value equal to 0%. However, according to the present embodiment, since the minimum output of the motor 13 is −40%, it is necessary to secure the feed command value of −40% to drive the motor 13 with the minimum output of −40% or less. Therefore, for example, when the command value of 5% is given, the discharge shortage amount is 5%, but 40% and −40% are added to the discharge command value and the feed command value, respectively, to make the addition amount serving as the total command value equal to 0%. That is, the command value of 45% for the generator 15 and the command value of −40% for the compressor 10 are added to each other to coincide with the actual command value of 5%, thereby preventing inconsistency with the actual command value. As a result, the command value for the generator 15 becomes 45%, so that the generator 15 can achieve the minimum output of 10%, and the command value for the motor 13 becomes −40%, so that the motor 13 can also achieve the minimum output of −40%.

According to the present embodiment, the feed determination unit 30*a* can determine whether the feed command value is large enough to drive the motor 13, and the discharge determination unit 30*c* can determine whether the discharge command value is large enough to drive the generator 15. When a determination is made that one of the command values is not large enough, that is, an output less than the specified minimum output is required, the motor 13 or the generator 15 cannot be driven separately, but the use of the output of one of the motor 13 and the generator 15 for the output of the other by the input and output adjustment unit 30*e* allows the motor 13 and the generator 15 to be driven simultaneously. Specifically, with considering given to power to be input (input power) and power to be output (output power), since the feed command value and the discharge command value have an offset relation, when the feed command value is insufficient, the feed command value is increased, and the discharge command value is increased by the same amount to cause both the command values to offset each other, thereby compensating for a shortage of the feed command value. Further, when the discharge command value is insufficient, the discharge command value is increased, and the feed command value is increased by the same amount to cause both the command values to offset each other, thereby compensating for a shortage of the discharge command value. A typical CAES generator that does not have such a configuration according to the present embodiment is not capable of responding to a feed command value or a discharge command value that does not reach to the specification, but, the configuration of the present embodiment allows the operation to continue even when such a command value is given.

Further, according to the present embodiment, the feed shortage calculation unit can calculate the feed shortage amount, and the input and output adjustment unit 30*e* can compensate for the feed shortage amount, and thus it is possible to secure the minimum charge power for driving the motor 13. Therefore, it is possible to execute the operation to continue even when a feed command value that does not reach to the specification is given.

Further, according to the present embodiment, the discharge shortage calculation unit can calculate the discharge shortage amount, and the input and output adjustment unit can make up for the discharge shortage amount, and thus it is possible to secure the minimum discharge power for driving the generator 15. Therefore, it is possible to execute the operation to continue even when a discharge command value that does not reach to the specification is given.

Second Embodiment

Figure 4:
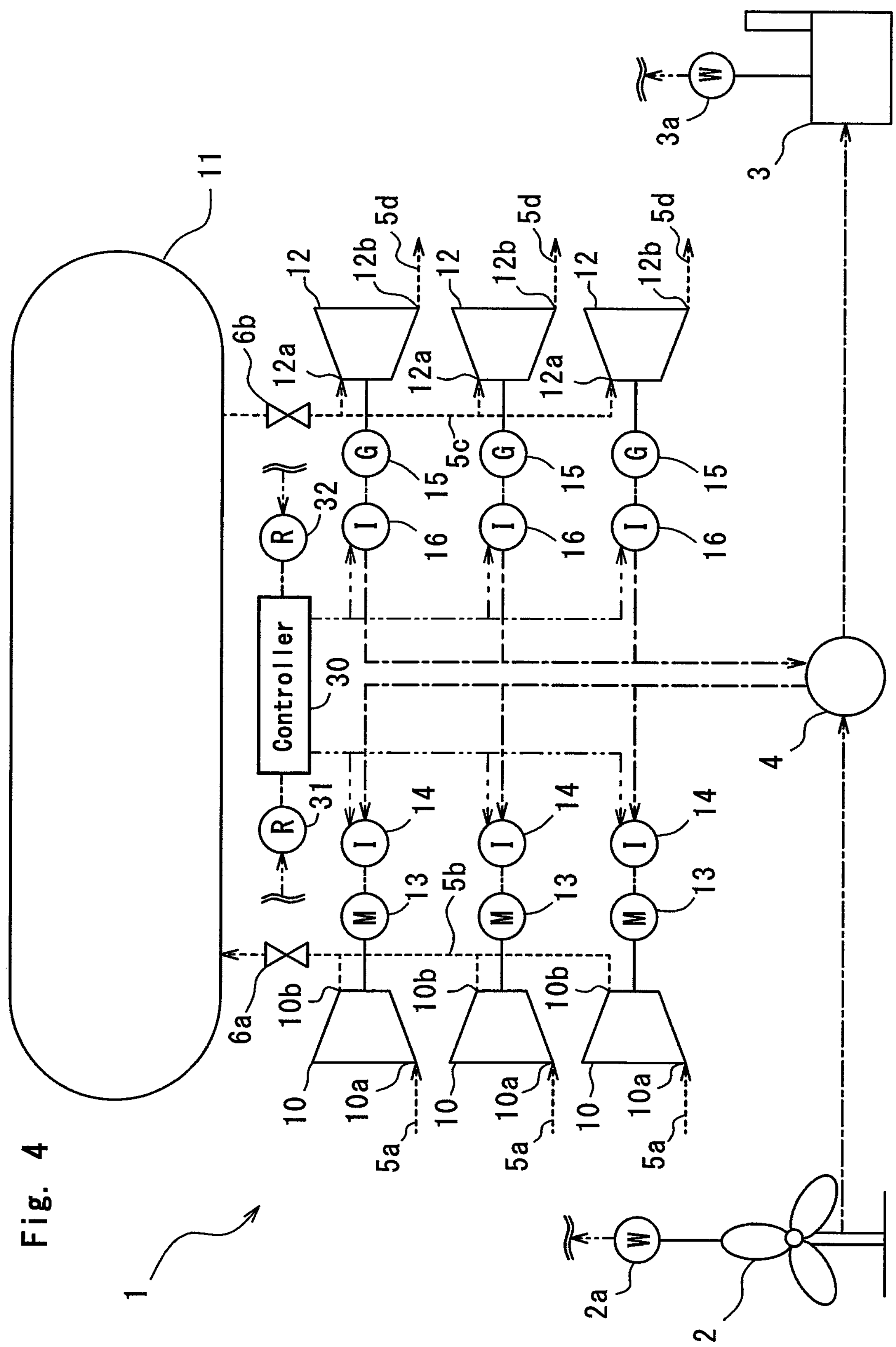
FIG. 4 is a schematic configuration diagram of a compressed air energy storage generator according to a second embodiment.
Figure 5:
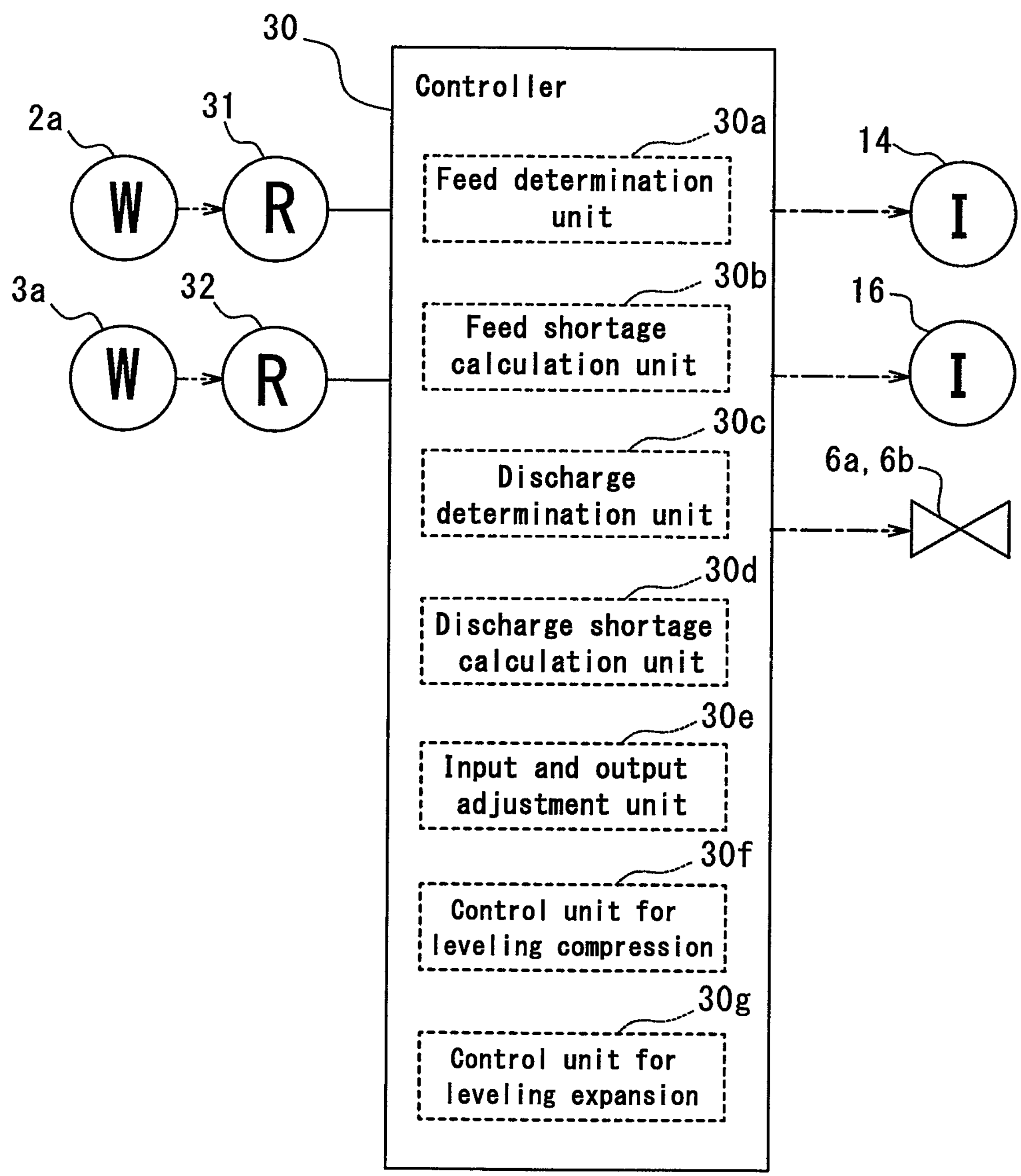
FIG. 5 is a control block diagram of the compressed air energy storage generator according to the second embodiment.

A CAES power generator 1 of the present embodiment shown in FIG. 4 differs from the first embodiment in that pluralities of compressors 10 and expanders 12 are provided. The other configuration is the same as the configuration of the CAES power generator 1 of the first embodiment shown in FIG. 1. Therefore, the same components as the components of the configuration shown in FIG. 1 are denoted by the same reference numerals and the description of the components is omitted.

According to the present embodiment, three compressors 10 are provided, and motors 13 are each mechanically connected to the respective compressors 10. An electric-motor inverter 14 is electrically connected to each of the motors 13. Further, according to the present embodiment, three expanders 12 are provided, and generators 15 are each mechanically connected to the respective expanders 12. Generator inverters 16 are each electrically connected to the respective generators 15. Note that, although not shown in detail in FIG. 4, compressed air can be selectively supplied from any of the compressors 10 to a pressure accumulation tank 11, and the compressed air can be also selectively supplied from the pressure accumulation tank 11 to any of the expanders 12.

A controller 30 of the present embodiment includes a feed determination unit 30*a*, a feed shortage calculation unit 30*b*, a discharge determination unit 30*c*, a discharge shortage calculation unit 30*d*, an input and output adjustment unit 30*e*, and a control unit for leveling compression 30*f*, and a control unit for leveling expansion 30*g*.

The control unit for leveling compression 30*f* controls each of the electric-motor inverters 14 so as to level off drive times of combinations of the compressors 10 and the motors 13. Specifically, the drive time of each of the combinations of the compressors 10 and the motors 13 is measured, and a higher priority is given to a combination of a compressor 10 and a motor 13 with a shorter drive time. This priority is preferably updated at the initial launch of operation and the like. This prevents a situation where a combination of a compressor 10 and a motor 13 in operation is stopped, and then another combination of a compressor 10 and a motor 13 is driven, and thus stable operation becomes possible.

The control unit for leveling expansion 30*g* controls each of the generator inverters 16 so as to level off drive times of combinations of the expanders 12 and the generators 15. Specifically, the drive time of each of the combinations of the expanders 12 and the generators 15 is measured, and a higher priority is given to a combination of an expander 12 and a generator 15 with a shorter drive time. This priority is preferably updated at the initial launch of operation and the like. This prevents a situation where a combination of an expander 12 and a generator 15 in operation is stopped, and then another combination of an expander 12 and a generator 15 is driven, and thus stable operation becomes possible.

According to the present embodiment, since the drive times of the combinations of the compressors 10 and the motors 13 can be leveled off by the control unit for leveling compression 30*f*, it is prevented that only specific compressors 10 and motors 13 are driven and deteriorated.

Further, according to the present embodiment, since the drive times of the combinations of the expanders 12 and the generators 15 can be leveled off by the control unit for leveling expansion 30*g*, it is prevented that only specific expanders 12 and generators 15 are driven and deteriorated.

According to the embodiment and the modification of the embodiment described herein, anything that is steadily (or repeatedly) replenished with natural power, such as wind power, solar light, solar heat, wave power or tidal power, flowing water or tide, or the like, and utilizes energy that fluctuates irregularly may be within the scope of the target of renewable energy from which power is generated. Further, it is also possible to use commercial power as the input power that fluctuates due to that another apparatus in a factory consumes large power.

As described above, although a description has been given of the specific embodiment and the modification of the embodiment according to the present invention, the present invention is not limited to such an embodiment or modification and may be variously modified and implemented within the scope of the present invention. For example, a suitable combination of the respective contents of the embodiments may be implemented as an embodiment of the present invention.

The invention claimed is:

1. A compressed air energy storage generator comprising:

an electric motor configured to be driven with input power that fluctuates;

a compressor configured to be driven by the electric motor to compress air;

a pressure accumulator configured to hold the compressed air discharged from the compressor;

an expander configured to be driven with the compressed air supplied from the pressure accumulator;

a generator configured to be driven by the expander to supply, to a consumer facility, output power that fluctuates;

an electric-motor inverter configured to change a rotation speed of the electric motor;

a generator inverter configured to change a rotation speed of the generator;

a feed command receiver configured to receive the input power as a feed command value before feeding the input power;

a discharge command receiver configured to receive, from the consumer facility, demand power as a discharge command value before outputting the output power; and a controller including a feed determination unit, a discharge determination unit, and an input and output adjustment unit, the feed determination unit being configured to determine whether the feed command value is smaller than minimum charge power corresponding to a minimum rotation speed of the electric motor, the discharge determination unit being configured to determine whether the discharge command value is smaller than minimum discharge power corresponding to a minimum rotation speed of the generator, the input and output adjustment unit being configured to control, when the feed determination unit determines that the feed command value is smaller than the minimum charge power or when the discharge determination unit determines that the discharge command value is smaller than the minimum discharge power, the electric-motor inverter and the generator inverter to simultaneously drive the electric motor and the generator.

2. The compressed air energy storage generator according to claim 1, wherein the controller further includes a feed shortage calculation unit configured to calculate, when the feed determination unit determines that the feed command value is smaller than the minimum charge power, a difference between the feed command value and the minimum charge power as a feed shortage amount, wherein the input and output adjustment unit drives the generator to generate power equal to or greater than the feed shortage amount, and drives the electric motor with power that is equal to or greater than the minimum charge power and includes both the input power indicated by the feed command value and the power equal to or greater than the feed shortage amount generated by the generator.

3. The compressed air energy storage generator according to claim 1, wherein the controller further includes a discharge shortage calculation unit configured to calculate, when the discharge determination unit determines that the discharge command value is smaller than the minimum discharge power, a difference between the discharge command value and the minimum discharge power as a discharge shortage amount, wherein the input and output adjustment unit drives the generator at the minimum rotation speed or higher and drives the electric motor with power that is equal to or greater than the discharge shortage amount and equal to or greater than the minimum charge power.

4. The compressed air energy storage generator according to claim 1, wherein pluralities of the compressors and the electric motors are provided, and the controller further includes a control unit for leveling compression configured to control the electric-motor inverter to level off drive times of combinations of the compressors and the electric motors.

5. The compressed air energy storage generator according to claim 1, wherein pluralities of the expanders and the generators are provided, and the controller further includes a control unit for leveling expansion configured to control the generator inverter to level off drive times of combinations of the expanders and the generators.

6. The compressed air energy storage generator according to claim 2, wherein pluralities of the compressors and the electric motors are provided, and the controller further includes a control unit for leveling compression configured to control the electric-motor inverter to level off drive times of combinations of the compressors and the electric motors.

7. The compressed air energy storage generator according to claim 3, wherein pluralities of the compressors and the electric motors are provided, and the controller further includes a control unit for leveling compression configured to control the electric-motor inverter to level off drive times of combinations of the compressors and the electric motors.

8. The compressed air energy storage generator according to claim 2, wherein pluralities of the expanders and the generators are provided, and the controller further includes an control unit for leveling expansion configured to control the generator inverter to level off drive times of combinations of the expanders and the generators.

9. The compressed air energy storage generator according to claim 3, wherein pluralities of the expanders and the generators are provided, and the controller further includes an control unit for leveling expansion configured to control the generator inverter to level off drive times of combinations of the expanders and the generators.

* * * * *